Aug. 2, 1932.   L. V. FOSTER   1,869,414
SOUND REPRODUCING APPARATUS
Filed May 29, 1931
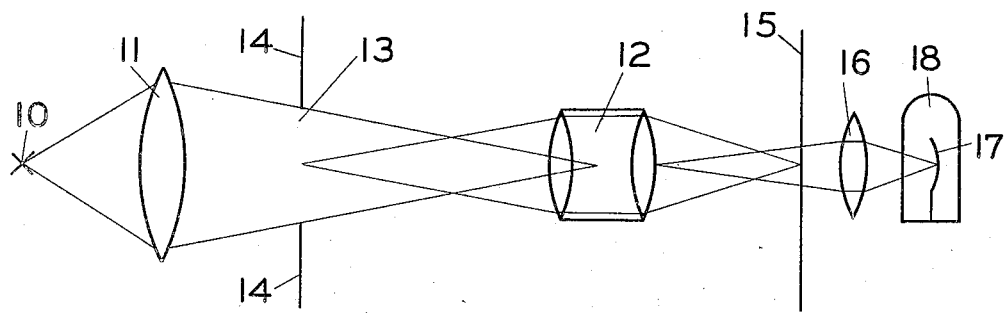
LEON V. FOSTER
INVENTOR
BY *G. A. Ellestad*
ATTORNEY Patented Aug. 2, 1932

1,869,414

UNITED STATES PATENT OFFICE

LEON V. FOSTER, OF IRONDEQUOIT, NEW YORK, ASSIGNOR TO BAUSCH & LOMB OPTICAL COMPANY, OF ROCHESTER, NEW YORK, A CORPORATION OF NEW YORK

SOUND REPRODUCING APPARATUS

Application filed May 29, 1931. Serial No. 541,023.

This invention relates to the art of reproducing sounds which have been photographically recorded on a film. In the reproduction of sound by one well known method a reduced image of an illuminated slit is projected onto the sound record. Varying densities or areas of the sound record cause varying amounts of light to pass through the film and fall on the electrode of a light-sensitive cell so that current variations are set up in the circuit of the light-sensitive cell and by suitable apparatus are translated into sound, all as is well known to those skilled in the art.

Under the prior art methods, non-uniform and generally poor reproduction are due, in part, to the fact that the sensitivity of the light-sensitive cell varies for different points on the area of its electrode.

One of the objects of my invention is to provide an improved means for reproducing sound from a photographic record. Another object is to provide means for overcoming the defects of sound reproduction which are due to non-uniform sensitivity of different points on the electrode of a light-sensitive cell. Other objects and advantages reside in certain novel features of construction, arrangement and combination of parts as will hereinafter be more fully explained and pointed out in the appended claim.

The figure of the drawing shows a diagrammatic view of a sound reproducing system embodying my invention. A light source 10 is imaged by lens 11 in the objective lens 12. A slit 13 formed by two spaced, opaque members 14 is illuminated by the light source and a reduced image of the illuminated slit 13 is projected by objective lens 12 onto the sound record which is carried by the film 15. The light filled aperture of lens 12 is imaged by the collective lens 16 on the electrode 17 of the light sensitive cell 18 and therefore the conjugate foci of lens 16 are located, respectively, at the lens 12 and at the electrode 17.

By means of lens 16, the light rays which pass through the film are focused onto the electrode 17 as an area of light having a substantially uniform intensity throughout its area. When either a variable density or variable area sound record is used the spot of light on the electrode 17 has a substantially fixed area and all points of the area have substantially the same intensity of illumination. As the film is moved the intensity of the illumination varies with the sound record but the illuminated area on the electrode remains substantially fixed in size. Under the prior art methods when a variable area sound record is used, the spot of light on the electrode varies in size and the illumination of the spot is not uniform. When using a variable density sound record under the prior art methods, the spot of light on the electrode has a substantially fixed area but the illumination is not uniform. Hence, non-uniform and inferior sound reproduction results when prior art methods are used. By means of my invention, however, I am able to overcome these difficulties and provide a sound reproducing apparatus which will function satisfactorily and uniformly despite the fact that different points on the electrode of the light-sensitive cell have different sensitivities.

I claim:

An apparatus for reproducing sound from a sound record on a film, comprising a light-sensitive cell having an electrode, an objective lens for projecting an image of an illuminated slit onto the sound record on the film, said electrode being positioned to receive light rays which pass through portions of the sound record and a collective lens positioned between said objective lens and said cell, the conjugate foci of said collective lens being positioned, respectively, at said electrode and said objective lens.

LEON V. FOSTER.